VERTICALLY ADJUSTABLE SIGN

Filed April 29, 1968

INVENTOR
DONALD W. BROWN

BY
McLean, Morton & Boustead
ATTORNEYS

INVENTOR
DONALD W. BROWN

BY
McLean, Morton & Boustead
ATTORNEYS

VERTICALLY ADJUSTABLE SIGN

Filed April 29, 1968 9 Sheets-Sheet 3

INVENTOR
DONALD W. BROWN
BY
McLean, Morton & Boustead
ATTORNEYS

INVENTOR

DONALD W. BROWN

BY McLean, Morton & Boustead
ATTORNEYS

VERTICALLY ADJUSTABLE SIGN

Filed April 29, 1968 9 Sheets-Sheet 5

INVENTOR

DONALD W. BROWN

BY McLean, Morton & Boustead
ATTORNEYS

INVENTOR
DONALD W. BROWN
BY
McLean, Morton & Boustead
ATTORNEYS

Oct. 5, 1971 D. W. BROWN 3,609,898

VERTICALLY ADJUSTABLE SIGN

Filed April 29, 1968

9 Sheets-Sheet 7

INVENTOR

DONALD W. BROWN

BY McLean, Morton & Boustead

ATTORNEYS

Oct. 5, 1971 D. W. BROWN 3,609,898

VERTICALLY ADJUSTABLE SIGN

Filed April 29, 1968 9 Sheets-Sheet 8

INVENTOR
DONALD W. BROWN

BY McLean, Morton & Boustead
ATTORNEYS

INVENTOR
DONALD W. BROWN

BY
McLean, Morton & Boustead
ATTORNEYS

United States Patent Office 3,609,898

Patented Oct. 5, 1971

3,609,898

VERTICALLY ADJUSTABLE SIGN

Donald W. Brown, 218 E. Curling Drive, Boise, Idaho 83702

Filed Apr. 29, 1968, Ser. No. 724,975
Int. Cl. G09f 7/18
U.S. Cl. 40—125 H 3 Claims

ABSTRACT OF THE DISCLOSURE

An outdoor advertising sign that can be vertically adjusted to change the display and incorporating a cable and winch mechanism for sign elevating, safety devices to prevent accidental lowering, and an internal illuminating means. Both single and double vertical pole signs employing several pole shapes are disclosed, as are several methods changing the position of the signboard.

The present invention relates to a vertically movable sign. More particularly the invention relates to a sign incorporating an electrical cable-pully system that can be employed to quickly and inexpensively change displays on the sign, and incorporates several safety devices.

BACKGROUND

The advertising on signs is often changed at frequent intervals. For instance, a grocery store might change its advertised specials every day or so. The conventional procedure for changing such displays is for an employee to take the appropriate new lettering and pictorial advertising out to the sign and remove and replace the lettering on a ladder. This procedure requires a considerable amount of time, involves some danger, and is relatively expensive. The present invention avoids such problems by making it possible for an employee to merely activate a signboard elevating device to lower the sign and, while standing on the ground, change the display without being in danger of falling, dropping letters from a height that would cause breakage or taking time to climb up and down a ladder and move it several times. Furthermore, the decreased cost of changing displays now makes possible more frequent changes and greatly increases the sales potential of the signboards.

In another application, on the other hand, rotating signs used, for instance, by service station generally do not have removable displays. The instant invention presents an improvement over such signs in allowing simple and inexpensive display changes, while maintaining the safe operational characteristics of such fixed signs.

DESCRIPTION OF INVENTION

The present invention is characterized by a single pole or two pole support system, a signboard that may be illuminated and has apparatus on which the display may be attached, an electrical cable-drum-pulley system to effect elevation, and several safety devices to prevent injury or damage to the sign if a failure occurs.

DESCRIPTION OF DRAWINGS

In order to better understand the invention, reference is made to the drawings as follows:

FIG. 13 is a perspective view of the sign in the embodiment wherein the poles are encased within the signboard.

FIG. 15 is a detail of the sealing device at the top of the sign.

FIG. 16 is a section taken along line 16—16 of FIG. 14 detailing the roller positions employed in the enclosed pole form of the invention.

FIG. 17 is a section taken along line 17—17 of FIG. 14 detailing the positioning of the winch mechanism in the enclosed form.

FIG. 18 is an alternative pole configuration employing I-beams.

Figure 1:
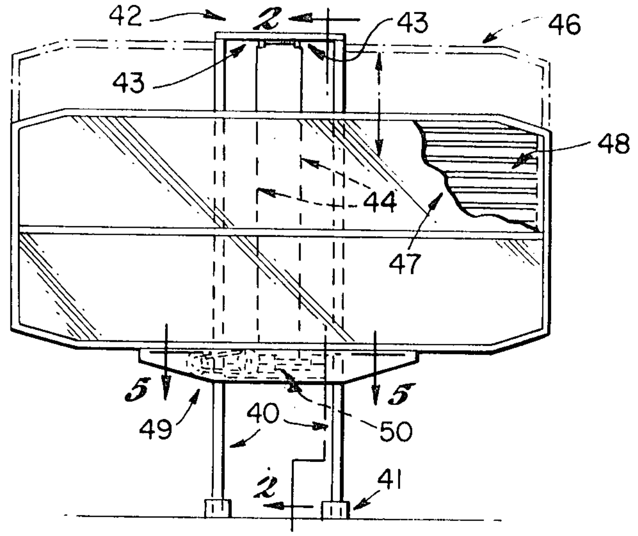
FIG. 1 is a sectional view of the two pole embodiment of the invention showing the sign in a partially lowered position.

Referring to the drawings in detail, in FIG. 1 the two support poles, 40, are mounted in the supporting surface, the ground, or a building roof, and are further supported by, for example, concrete blocks, 41 which also serve as a safety device in preventing the sign from descending to the surface and possibly causing injuries or damaging the signboard. The poles 40 are joined at the top by a cross beam 42, on which the pulleys 43 for the positioning cable 44 are mounted. The signboard, shown generally as 45 is shown in a partially lowered position with the raised position shown by phantom lines 46. A section of the signboard has been cut-away, 47, to indicate the internal illuminating means 48, which is preferably fluorescent lights but may be of any suitable type. The signboard is also shown as an irregular octagon, which along with the rectangular form of FIG. 13 are the preferred forms, but any shape sign is acceptable as the invention does not reside in the shape of the sign itself. A cover plate 49 is shown that obscures the mechanical means of elevating the sign, indicated generally by 50 and shown in detail in FIGS. 5, 6 and others.

Figures 2, 11, 12:
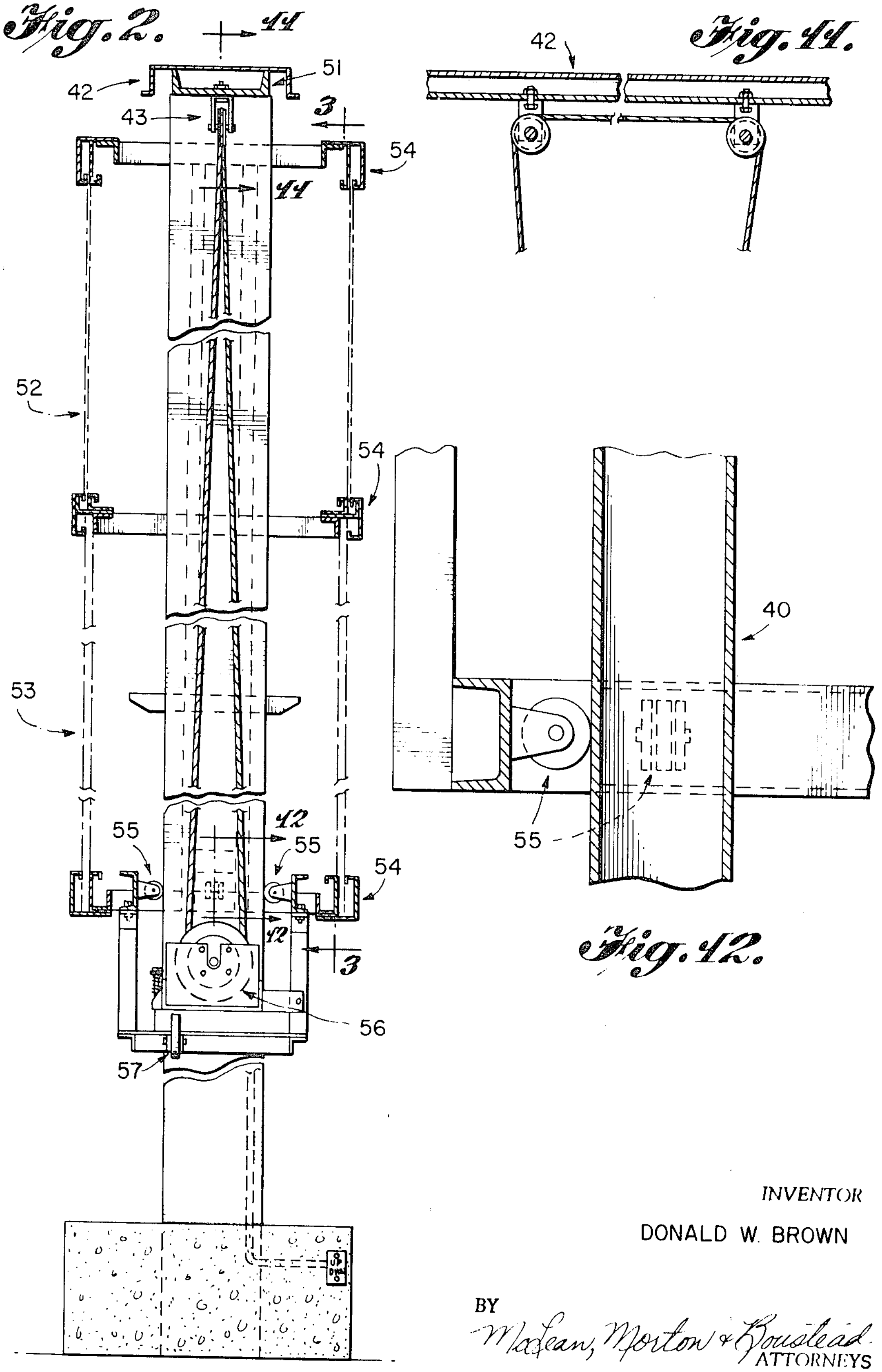
FIG. 2 is a section taken along line 2—2 of FIG. 1 detailing the signboard elevating mechanism.
FIG. 11 is a detail of an embodiment of the cable-pulley system at the top of the sign.
FIG. 12 is a detail of the positioning rollers.

In FIG. 2 at the top of the sign the protective channel 42 is shown as is channel 13 on which the pulleys 4 mount. The protective channel 42 butts against channel 51 and prevents precipitation and other undesirable material from fouling pulleys 43. The signboard is shown in two sections 52 and 53 and the metal mountings 54 for the display sections of the signboard are shown in section. The guide rollers and mounts 55 are shown bolted to signboard section 53 mounts 54 in the preferred form of the invention. Also shown is the sign positioning mechanism 56 to which is attached a safety device 57 that engages to lock the signboard in place when a cable breaks. The locking mechanism is a spring actuated cam that is engaged by the sign positioning mechanism 56 which is sprung downward upon cable failure.

Figure 3:
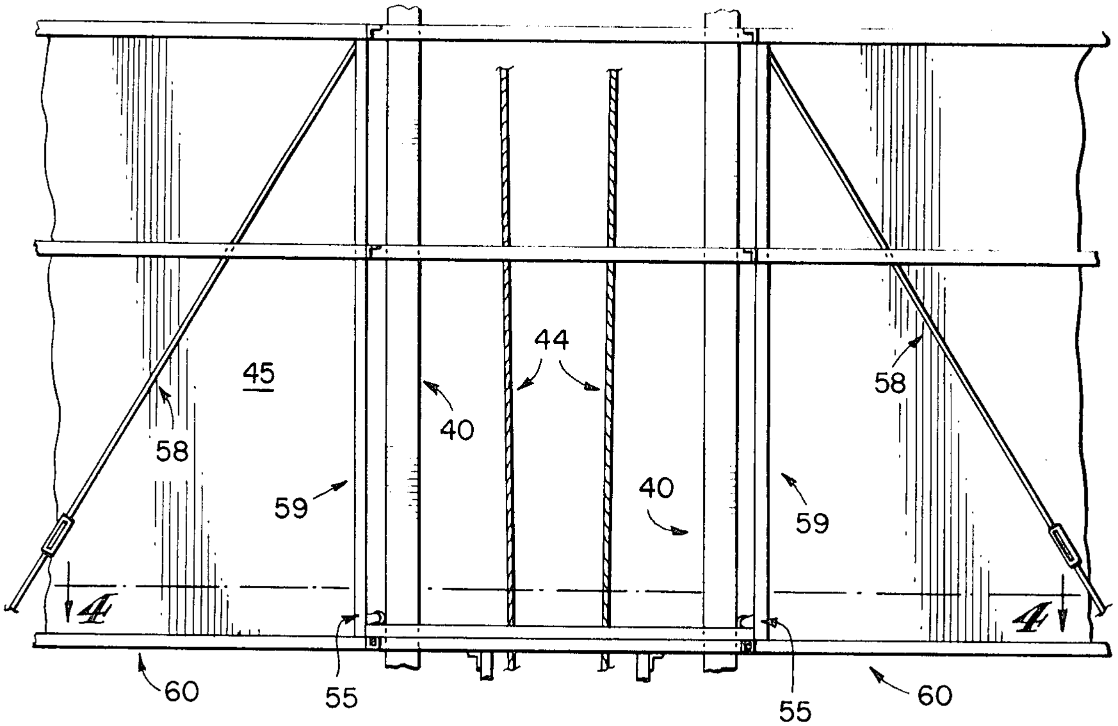
FIG. 3 is a detail of the structure of the signboard.

In FIG. 3 the details of the structure of the signboard 45 are shown. Structural support is effected by adjustable guy wires 58 connected to internal support beams 59 and frame 60.

Figure 4:
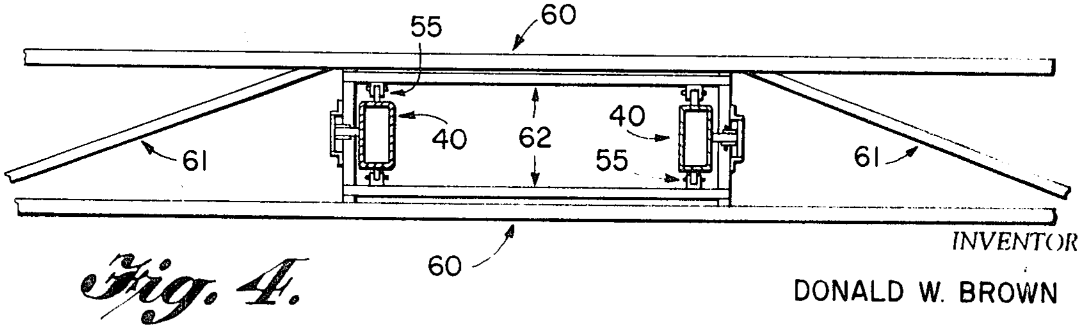
FIG. 4 is a section taken along line 4—4 of FIG. 3, showing the positioning of the guide rollers when employing a two pole embodiment of the invention.

In FIG. 4 additional support is shown by beams 61. Also shown is the preferred rectangular cross section of the support poles 40 and the internal frame 62 of signboard 45 on which the positioning rollers 51 are mounted.

Figure 5:
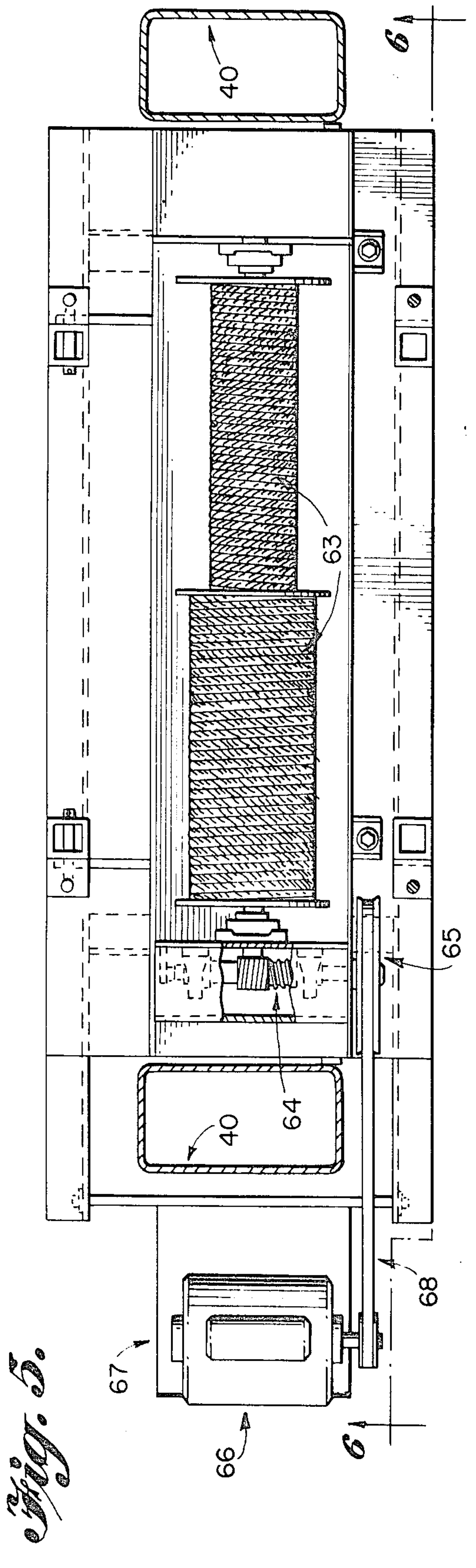
FIG. 5, a section taken along line 5—5 of FIG. 1, shows a top view of the differential drum-winch mechanism which may be employed.

In FIG. 5 the rectangular support poles 40 are drawn without including the positioning rollers 55. The signboard elevating mechanism is an electrically gear driven differential drum apparatus. The differential drum 63 is turned by a worm-spur gear mechanism 64. The gears 64 are driven by pulley 65 which is driven by the electrical motor 66, mounted on a hinged shelf 67, by belt 68.

Figure 6:
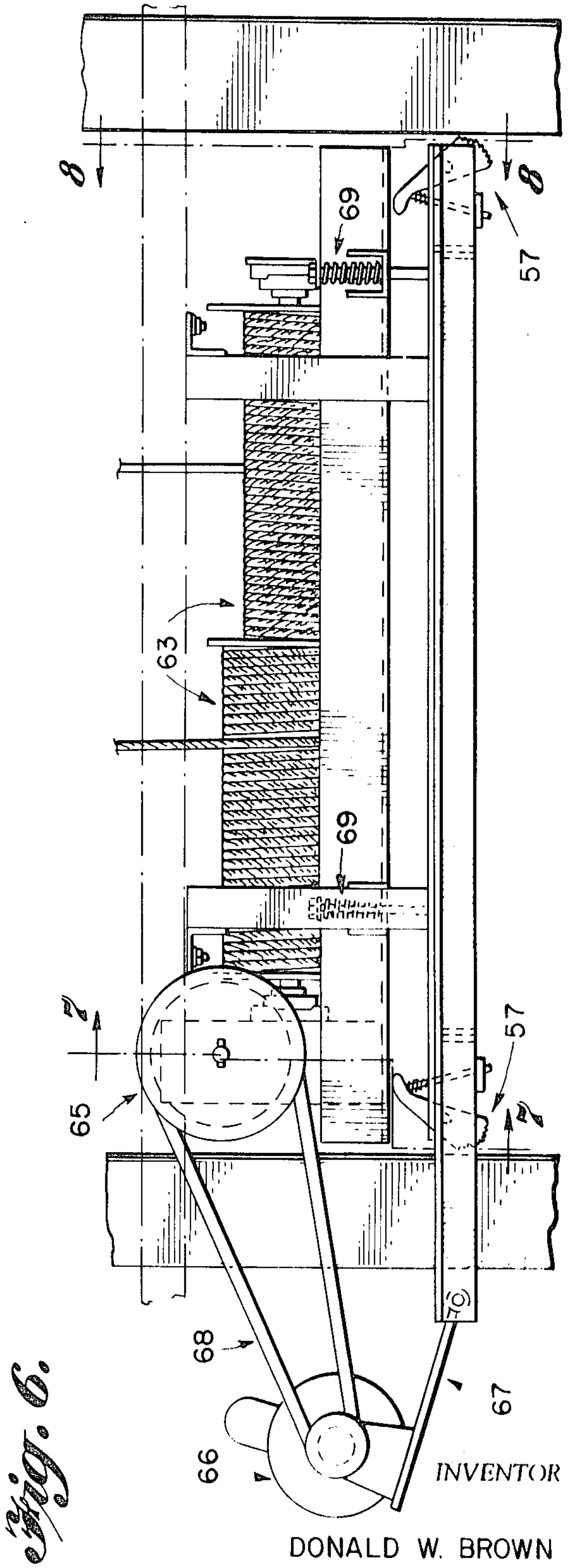
FIG. 6, a section taken along line 6—6 of FIG. 5, shows front view that includes the safety locking device that activates upon cable breakage.

In FIG. 6 the positioning of the motor 66, shelf 67 and pulley 65 are shown. Also shown in the drawing is the broken cable safety locking device 57 and its spring loaded actuating mechanism 69.

Figure 7:
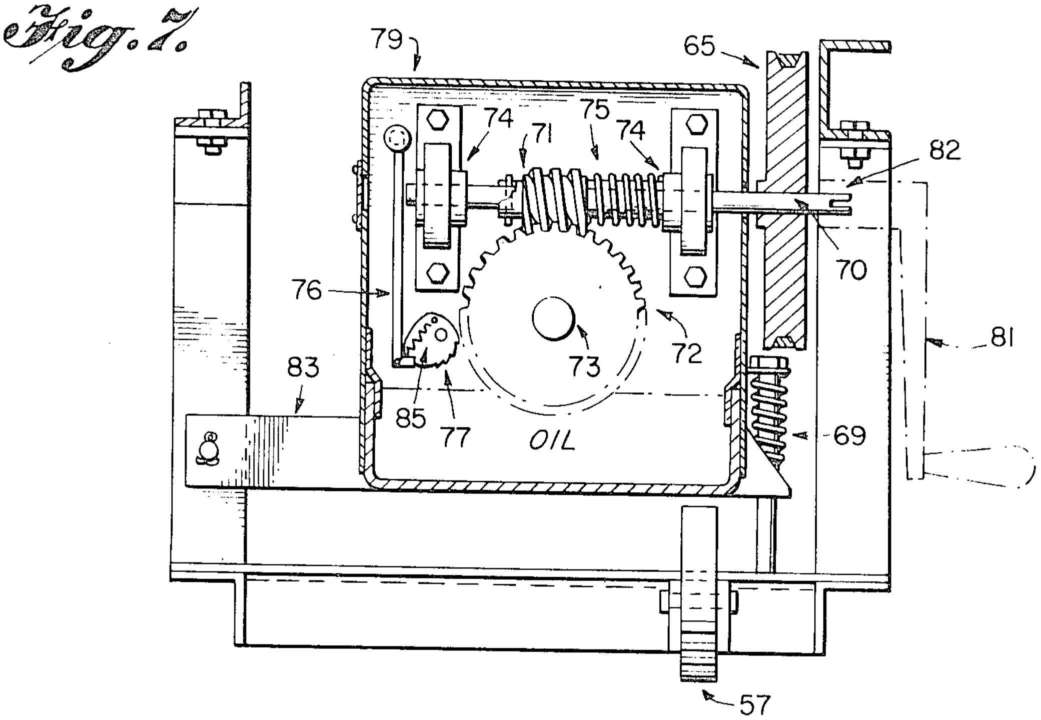
FIG. 7 is a section taken along line 7—7 of FIG. 6 detailing the gear driving mechanism for elevating or lowering the signboard.

In FIG. 7 the differential drum is driven by pulley 65 which is connected to shaft 70. A worm gear 71 which is driven by the shaft assembly 70 drives spur gear 72 which is connected to the differential drum by shaft 73. The pulley-worm shaft 70 is positioned by bearings 74 and is biased by spring 75. In the event of a malfunction in the worm-spur gear system, for example, tooth breakers in spur gear 71, spring 75 forces the shaft assembly 70 to the left thereby moving arm 76 which has been resting on cam 77 and releasing and turning the safety cam. Upon turning cam 77 is forced against spur gear 72 and locks the gear in position to prevent turning of the differential drum and thus prevent the cable from unwinding and lowering the sign. Lubrication is effected by the oil in pan 78 and the system is protected by cover 79 on which a small plate 80 is mounted to allow access to shaft assembly 70. In case of electrical failure removable crank 81 may be employed to raise or lower the signboard by inserting it into the extension 82 of shaft assembly 70 that protrudes past pulley 65.

Figure 8:
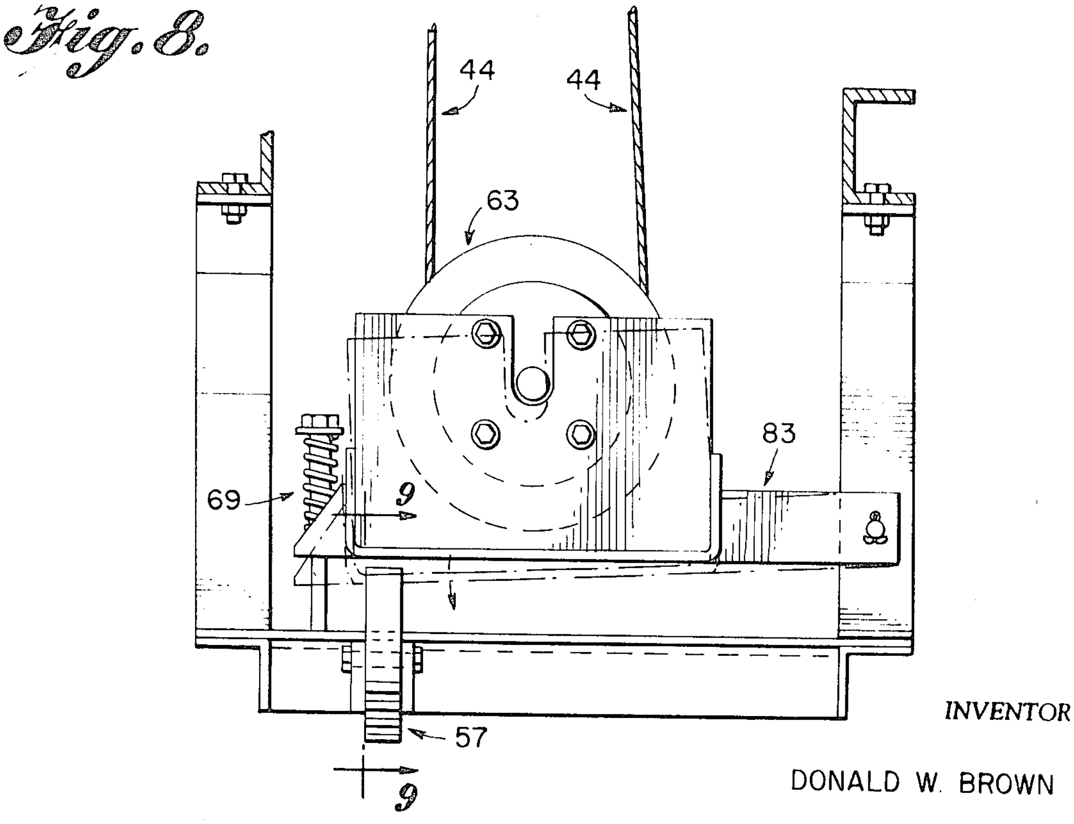
FIG. 8, a section taken along line 8—8 of FIG. 6 is a view of the positioning equipment detailing the effect of cable breakage.

In FIG. 8 the electric motor driven cable means for vertically elevating the signboard is shown before a break in cable 44 has occurred and after such a failure by phantom lines. In the event of such a break, spring 69 forces the hinged sign elevating mount 83 downward and engages safety cam 57 which is then forced against poles 40 thereby locking the signboard in position.

Figure 9:
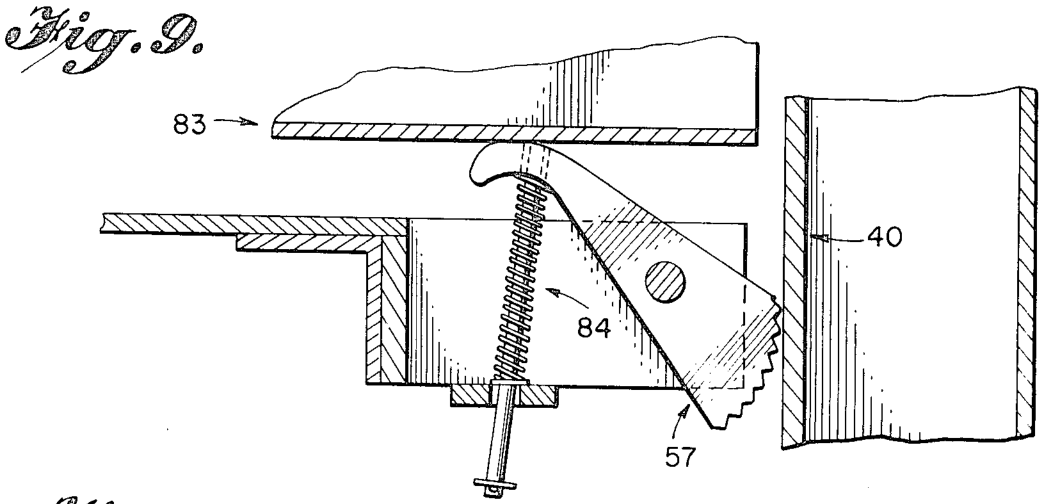
FIG. 9 is a detail of the broken cable locking mechanism, showing it engaged.

In FIG. 9 the hinged support 83 is shown resting upon the spring 84 loaded safety cam 57 and the cam is shown engaged with pole 40.

Figure 10:
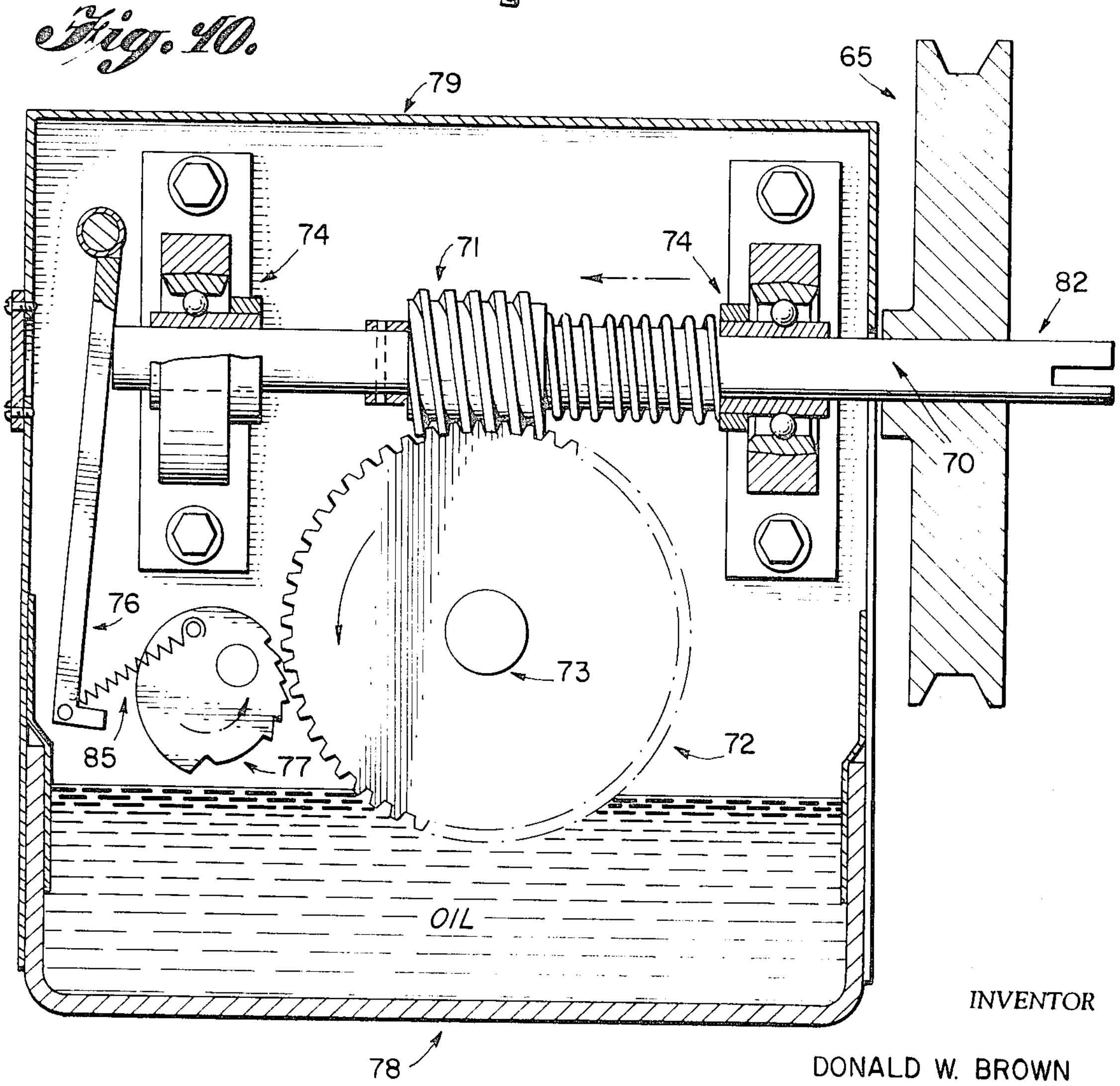
FIG. 10 is a detail of the worm gear-cam safety locking device, showing it engaged.
Figures 43, 45, 48:
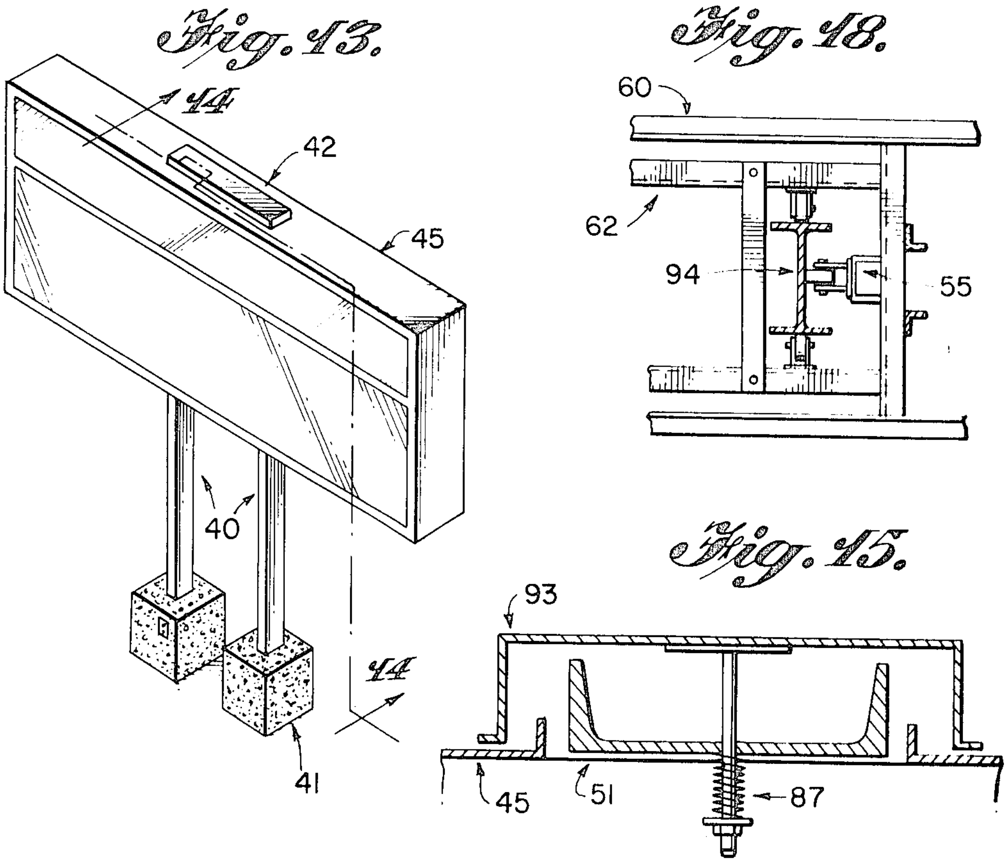
Figure 46:
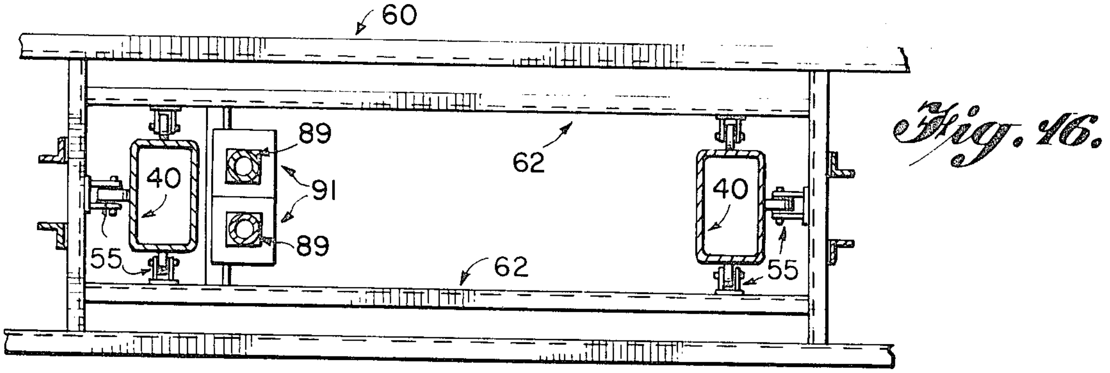
Figure 47:
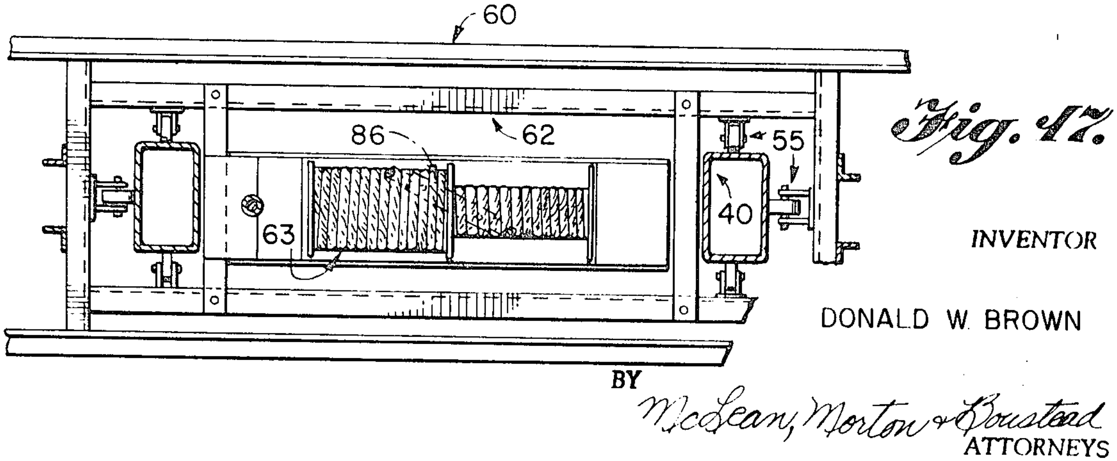

In FIG. 10 cam 77 is shown engaged with spur gear 72 by the action of spring 85 which is elongated by arm 76 and 77 after a malfunction in the worm-spur gear system has occurred.

In FIG. 11 the horizontal cross member 42 on which pulleys 43 are mounted is detailed. The pulleys 43 are located over the two sections of the differential drum so that even winding and unwinding will occur.

In FIG. 12 two of the positioning rollers 55 are shown located so that rollers 55 will be either in contact or close to pole 40 at all times during raising and lowering the signboard.

Figure 14:
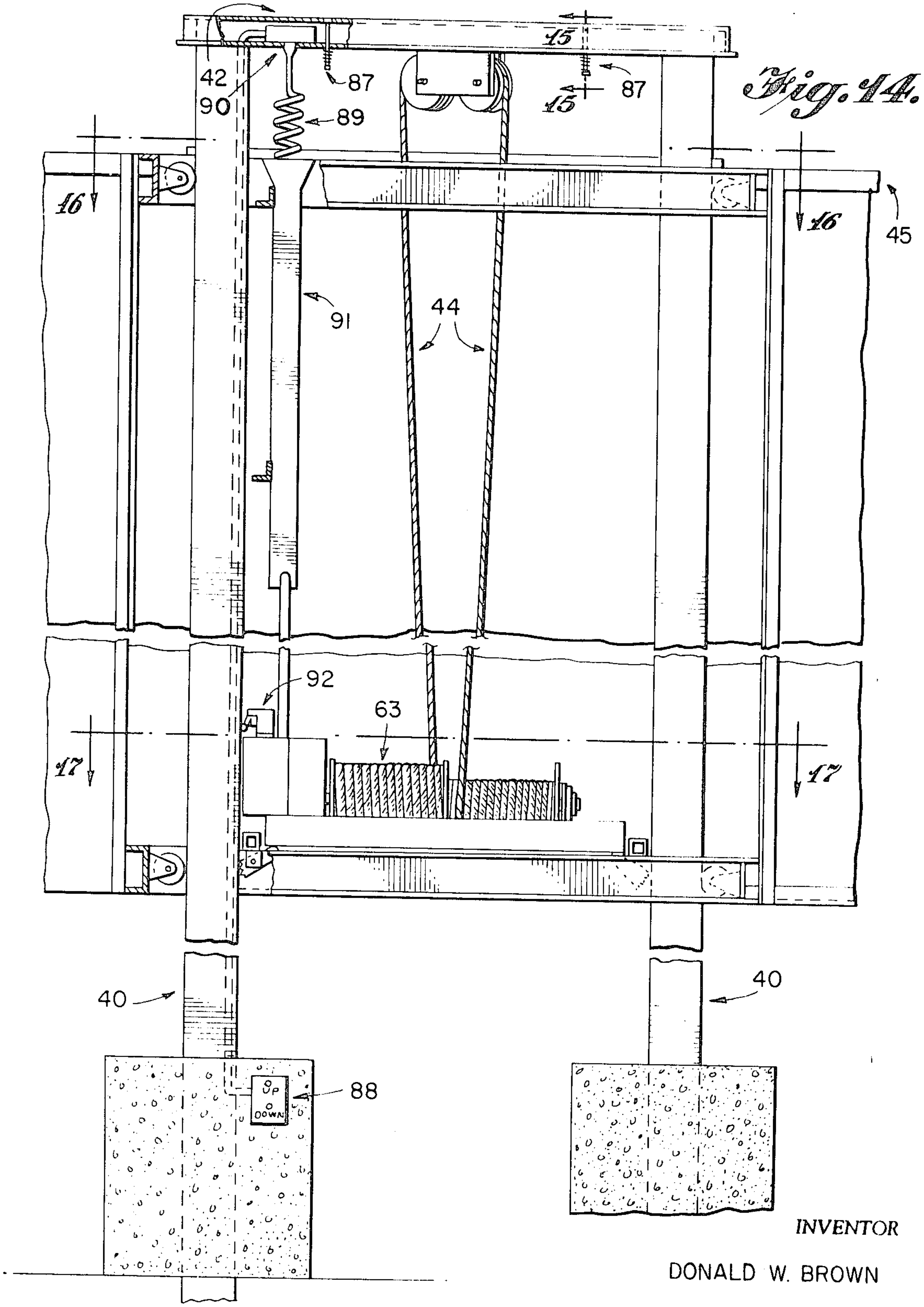
FIG. 14 is a section taken along line 14—14 of FIG. 13 showing the cable pulley system, positioning roller locations and electrical connections.

In FIG. 14 the cable 44 connected to differential drum 63 is shown with an alternative pulley configuration 48. Springs 87 are shown separated from the signboard 45. The electrical connections are also shown in this view. Spring loaded-key operated elevating and lowering electrical switches 88 are shown mounted in support block 42 with their wiring appearing within pole 40. The electrical connections to the signboard 45 are shown in the preferred form which is a coiled conduit 89 and plug 90 shown along cross member 42. Coiled electrical cord 89 appears partly extended out of its protective covering 91, and a limit switch 92 is also shown. The limit switch is used to prevent the signboard from being lowered all the way to the ground and also to shut off current when the signboard 45 reaches the top of the support system.

In FIG. 15 spring 87 holds cover channel 93 down against channel 51 except when the top of signboard 45 engages channel 93. As shown the spring is released and channel 93 is above signboard 45.

In FIG. 16 is shown the two coiled electrical conduits 89 and their protective sheaves 91 as well as the basic frame structure 60 and 62.

In FIG. 17 the position of pulley 86 with respect to differential drum 63 is shown.

In FIG. 18 the alternative construction wherein an I-beam 94 is employed as a support pole, is shown.

Figures 19, 20:
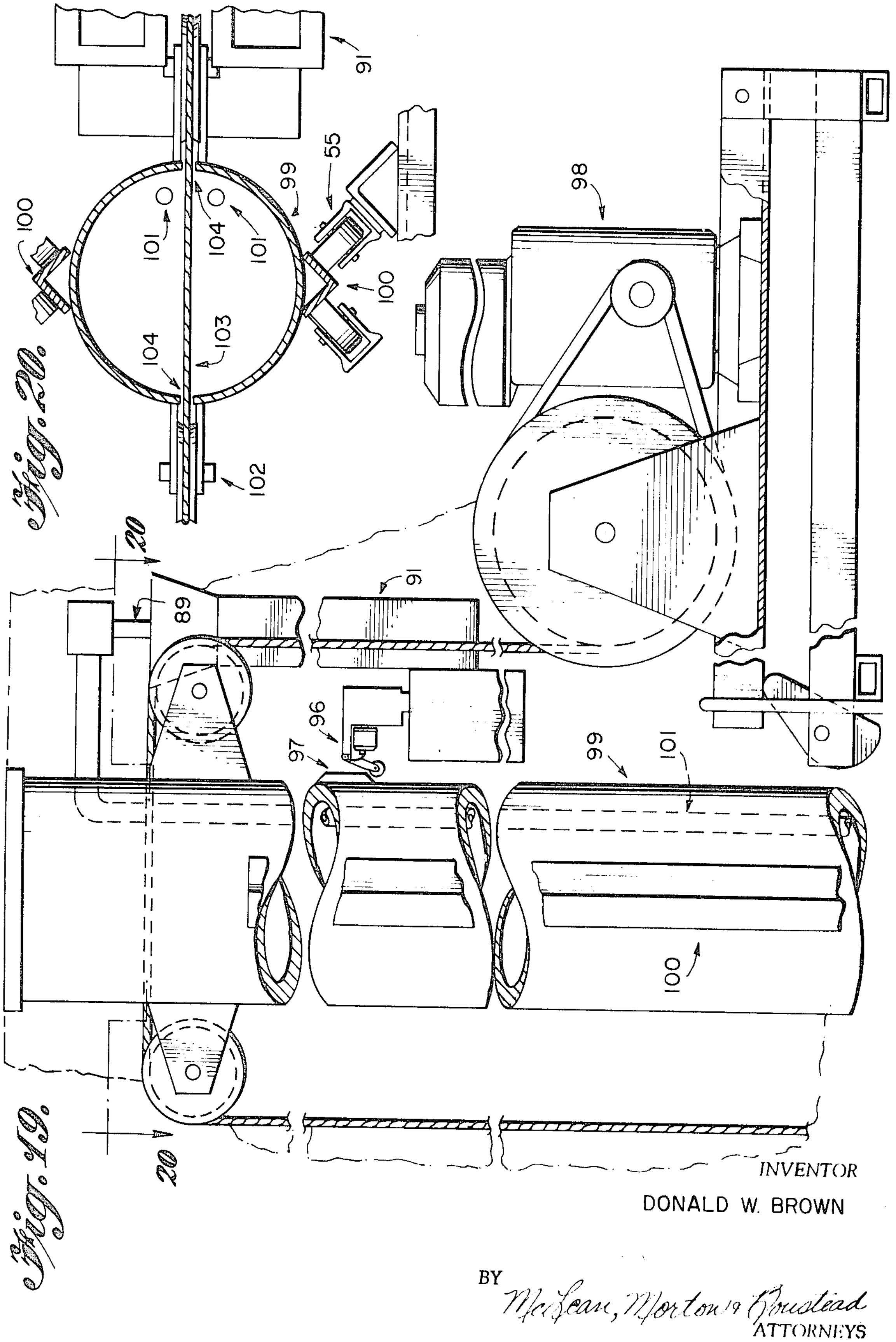
FIG. 19 is a view showing the single circular pole embodiment of the invention, and detailing the cable-pulley system, the motor-drive system, electrical connections (including a limit switch), and angle iron roller positioning bars.
FIG. 20 is a section taken along line 20—20 of FIG. 19 showing the cable cross-over system and roller positions.

In FIG. 19 selected portions of the single circular pole embodiment of the invention are detailed. The single diameter drum-drive mechanism 95 is located within the signboard itself. The limit switch 96 is actuated by a metal inset 97 and shuts off the motor 98 when the sign reaches the upper part of the pole 99. The circular pole 99 is shown with angle iron guides 100 and internal electrical conduits 101. Electrical conduit 101 is shown connected to the coiled conduit 89 and protective sheave 91.

In FIG. 20 a cross section of the circular pole 99, the two protective electrical sheaves 91, and the angle iron guides 100 with which rollers 55 are in contact are shown. Pulleys 102 are shown with cable 103 positioned and with holes 104 for the crossover of the cable shown in section.

Figure 21:
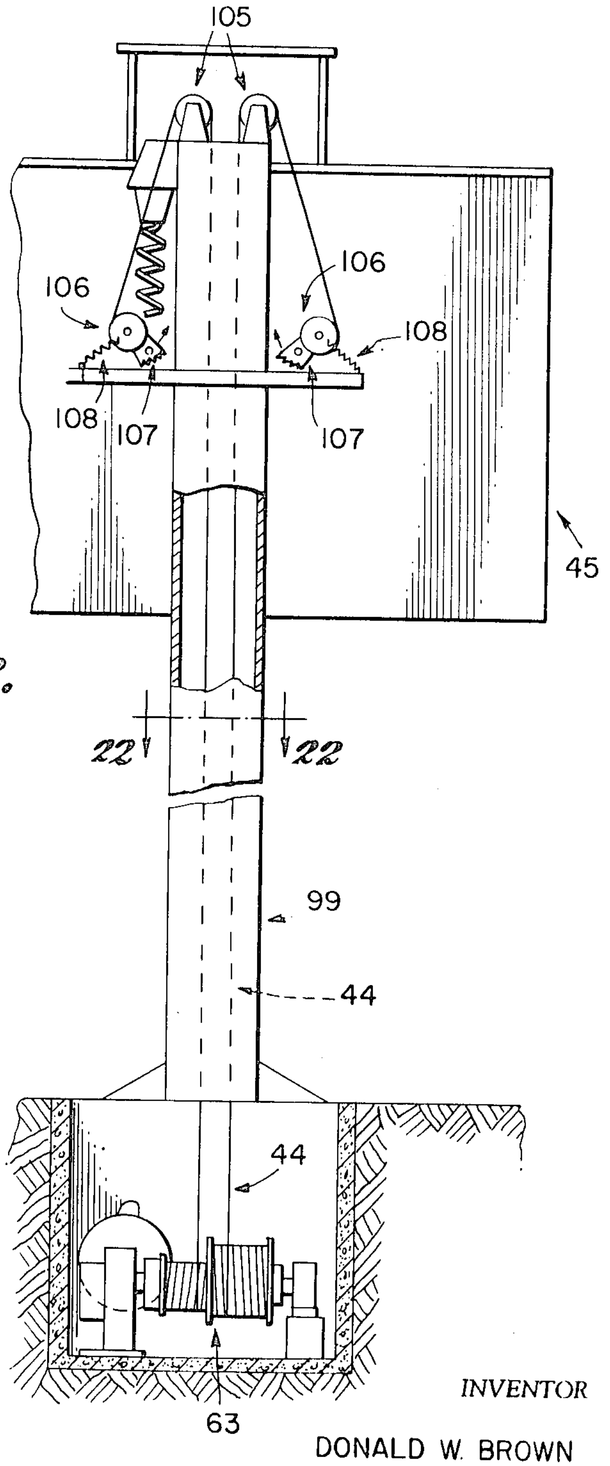
FIG. 21 is a view showing the embodiment of the invention wherein the cable-winch mechanism is detached from the signboard and detailing the cable-pulley system of this embodiment.

In FIG. 21 a differential drum 63 is employed but is located below the support pole 99. Cable 44 is located within the single pole 99 in this embodiment and positioning of the signboard 45 is effected by winding or unwinding cable 44 which is passed around pulleys 105 located on the top of support 99, and pulleys 106 located within signboard 45. A cam safety device 107 to prevent sign from falling after cable failure is mounted within signboard 45 and is locked into position by spring 108. Cam 107 is moved by spring 108 which is biased by pulley 106 and has been released by the failure of cable 44.

Figure 22:
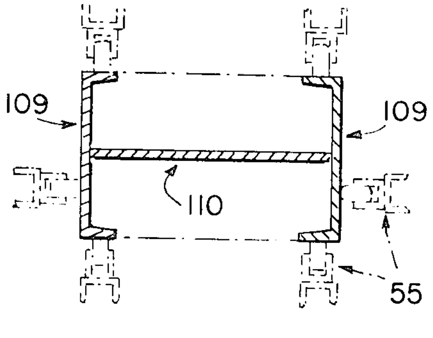
FIG. 22 is a section of FIG. 21 taken along line 22—22 and detailing the channel iron-web embodiment of the single pole system.

In FIG. 22 the alternate form wherein the positioning rollers 55 are in contact with channel irons 109 which have web 110 positioned centrally therebetween is shown.

Figure 23:
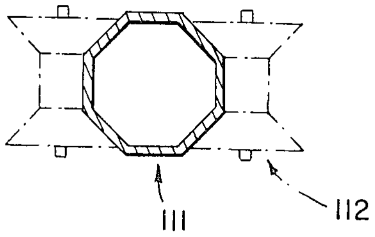
FIG. 23 is a detail showing roller positioning in a single octagonal pole embodiment of the invention.

In FIG. 23 another pole configuration, wherein a regular octagonal pole 111 is employed in combination with special rollers 112 is shown.

Figure 24:
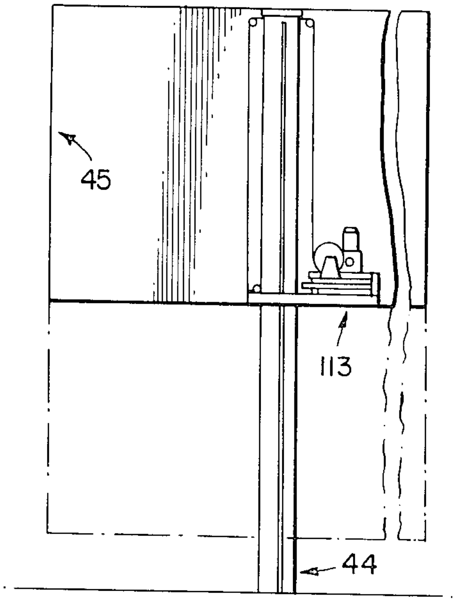
FIG. 24 is a view showing the winch embodiment wherein a differential drum is not used.

In the variation of FIG. 24 the elevating mechanism 113 and cable 103 are shown in their preferred embodiments. The signboard 45 is shown in the raised position, but is also indicated in the lower position which is employed when changing the display.

During the operation of changing the displays the employee merely inserts a key into the locked electrical switch, lowers the signboard, changes the display, and raises the signboard by inserting the key into the second switch and turning. This operation consumes less time and is safer than conventional methods of changing displays, as noted before.

In the preferred forms of the invention as shown in FIGS. 1, 2, 13, 14 and 21, the operator turns the lowering switch 88 which actuates the electrical motor 66 causing it to turn in the direction that will unwind the portion of the cable that is wound around the larger diameter section of the differential drum 63, and take up the portion of the cable that is attached to the smaller diameter section of the drum thus causing the signboard 45 to be lowered. The reverse occurs when the raising switch is operated.

As shown in FIGS. 8 and 9, should the cable 44 break during raising or lowering, or at any other time, the hinged platform 83 on which the elevating means is mounted will shift downward due to the compressed spring 69 being released and compress spring 84 that holds the sign board locking cam 57 away from the support pole or poles 40. The weight of the platform will also aid in holding signboard locking cam 57 against pole 44 and maintain signboard 45 in position until repairs can be made.

When a failure occurs in the gear drive section of the cable drive, as shown in FIGS. 7 and 10, the shift assembly 70 on which worm gear 71 is mounted will shift outward due to the pressure exerted by compressed spring 75. The shaft assembly 70 will engage arm 76 positioned outside shaft mounting bearings 74 and cause it to release locking cam 77 which will turn by spring 85 which has been extended by arm 76. Cam 77 will then engage spur gear 72 and lock it in place thus not allowing differential drum shaft 73 to rotate and lower the sign.

Also, as shown in FIGS. 1, 2, 13, 14 and 19, to prevent damage to the sign and possible personal injury a means to prevent signboard 45 from reaching the supporting surface is also provided. This may take the form of a limit switch 96, a protrusion 41 around the poles 40, or some other device which serves the purpose.

Although the above description of the instant invention has generally been with reference to preferred embodiments, numerous rearrangements and modifications could be made and the result would still be within the scope of the invention which is defined by the claims.

It is claimed:

1. In an outdoor advertising sign including plural vertical support means, a signboard having at least one face, and display attaching means on said signboard the improvement comprising:

(a) an electric motor driven cable means for elevating said signboard incorporating a differential drum, a cable and a gear pulley drive means, (b) a signboard position locking means responsive to cable failure incorporating a hinged support for said electric drive means and a spring biased cam that is positioned against said support means by said hinged support for said electric drive means, (c) a cable locking means responsive to failure in the electric drive means incorporating a cam which is turned by a spring connected to an arm that releases said cam and is moved by being contacted by the drive shaft for said gear drive means, and (d) a safety means preventing said signboard from descending to the surface below the signboard incorporating a protrusion from said plural support means.

2. In an outdoor advertising sign including a single vertical support means, a signboard having at least one face, display attaching means on said signboard the improvement comprising:

(a) an electric motor driven cable means for elevating said signboard incorporating a differential drum, a cable, and a gear pulley drive means, said electric drive means being located below said support means and said cable being within said support means and connected to said signboard by pulleys, (b) a signboard position locking means responsive to cable failure incorporating a spring biased by said cable, connected to the pulleys on said signboard and released when said cable fails, said spring causing a cam to move and lock against said support means when released by said cable, (c) a cable locking means responsive to failure in the electric drive means incorporating a cam which is turned by a spring connected to an arm that releases said cam and is moved by being contacted by the drive shaft for said gear drive means, and (d) a safety means preventing said signboard from descending to the surface below the signboard incorporating a protrusion from said singular support means.

3. In an outdoor advertising sign having plural vertical spaced supports, each of said supports having a surface facing said other support; a fixed upper horizontal support connecting said vertical supports, a generally rectangular signboard having thereon character display means vertically adjustable to a higher display position and a lower character display changing position, upper and lower horizontal spaced frame members for said signboard, extending horizontally outside and beyond said vertical spaced supports, lateral supports connecting said horizontal spaced frame members, said horizontal and lateral supports carrying guide rollers positioned to bear against said vertical supports, an electric motor-driven cable and drum for elevating and lowering said signboard, said cable connecting said upper horizontal support and said drum, said drum rotatable to contact or extend said cable by winding said cable on said drum generally vertical cams rotatably attached to said lower frame members, said lower portion of the cam extending outwardly and engageable by camming action with the facing surface of said vertical supports, said electric motor-driven cable drum mounted on a separate platform adjacent and above said lower frame member and movable vertically with respect thereto one edge of said platform pivotally attached to said lower frame members, the opposing edge of said platform engaging a stop attached to said lower frame member in said upper position, said platform biased in an opposite direction to the tension of the cable, said platform in its upper position supporting the frame and signboard by the tension of the cable and in its lower position resting on the upper and inwardly extending portion of the cam, thereby urging the lower outer end of said cam into engagement with the vertical support.

References Cited

UNITED STATES PATENTS

| | | | |
|---|---|---|---|
| 284,517 | 9/1883 | Walker | 187—20 |
| 1,983,459 | 12/1934 | Hockman | 192—8 |
| 2,125,994 | 8/1938 | Doering | 40—125 X |
| 2,403,333 | 7/1946 | Bjerke | 187—82 |
| 2,420,072 | 5/1947 | Foote | 254—184 |
| 2,591,494 | 4/1952 | Asachika | 40—125 H |
| 3,243,023 | 3/1966 | Boyden | 192—8 |

ROBERT W. MICHELL, Primary Examiner

L. R. OREMLAND, Assistant Examiner

U.S. Cl. X.R.

40—125 K